United States Patent
Pearlstein

(12)
(10) Patent No.: US 6,594,311 B1
(45) Date of Patent: Jul. 15, 2003

(54) METHODS FOR REDUCED COST INSERTION OF VIDEO SUBWINDOWS INTO COMPRESSED VIDEO

(75) Inventor: Larry Pearlstein, Newtown, PA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/124,568

(22) Filed: Jul. 29, 1998

Related U.S. Application Data

(60) Provisional application No. 60/064,584, filed on Oct. 20, 1997.

(51) Int. Cl.[7] .......................... H04B 1/66; G11B 17/031
(52) U.S. Cl. ................................ 375/240.01
(58) Field of Search ................ 375/240, 240.01, 375/240.02, 240.03, 240.1, 240.15, 240.16, 240.19, 240.2; 348/419.1, 420.1, 722, 402.1, 473, 426.1; 382/336, 338; G11B 27/031; H04B 1/66

(56) References Cited

U.S. PATENT DOCUMENTS

| | | | | | |
|---|---|---|---|---|---|
| 5,175,618 A | * | 12/1992 | Ueda et al. | ................ | 358/136 |
| 5,565,924 A | * | 10/1996 | Haskell et al. | ............ | 348/423 |
| 5,570,197 A | * | 10/1996 | Boon | ........................ | 386/46 |
| 5,687,095 A | * | 11/1997 | Haskell et al. | ............ | 364/514 |
| 5,715,009 A | * | 2/1998 | Tahara et al. | ............... | 348/423 |
| 5,729,293 A | * | 3/1998 | Keesman | ................... | 348/401 |
| 5,731,850 A | * | 3/1998 | Maturi et al. | ............... | 348/699 |
| 5,757,668 A | * | 5/1998 | Zhu | ........................... | 364/514 |
| 5,774,593 A | * | 6/1998 | Zick et al. | .................. | 382/236 |
| 5,801,778 A | * | 9/1998 | Ju | .............................. | 348/416 |
| 5,920,353 A | * | 7/1999 | Diaz et al. | .................. | 348/402 |
| 6,104,441 A | * | 8/2000 | Wee et al. | ................... | 348/722 |
| 6,151,359 A | * | 11/2000 | Acer et al. | ................... | 375/240 |
| 6,160,844 A | * | 12/2000 | Wilkinson | ................... | 375/240 |
| 6,181,711 B1 | * | 1/2001 | Zhang et al. | ............... | 370/468 |
| 6,181,743 B1 | * | 1/2001 | Baileul | ....................... | 375/240 |
| 6,226,041 B1 | * | 5/2001 | Florencio et al. | ........... | 348/473 |

FOREIGN PATENT DOCUMENTS

| | | | | |
|---|---|---|---|---|
| EP | 0 926678 A2 | * | 6/1999 | ......... G11B/27/031 |

* cited by examiner

*Primary Examiner*—Chris Kelley
*Assistant Examiner*—Tung T Vo
(74) *Attorney, Agent, or Firm*—Straub & Pokotylo; Michael P. Straub

(57) ABSTRACT

Methods and apparatus for encoding image data to facilitate subsequent insertion of local image data. Also methods and apparatus for inserting image data, e.g., at local broadcast stations, without having to fully decode a received encoded bitstream. The encoding methods involve treating images to be encoded as a plurality of distinct, non-overlapping image regions or segments for encoding purposes. Image segments which are designated for use for local data insertion are not used as reference data for motion compensated prediction purposes when generating motion vectors to represent image areas, e.g., the area representing the main picture, which are outside the local data insertion segments. Because image segments which may be replaced are not used as reference data for image segments which will not be replaced, unintentional prediction errors which might otherwise result from replacing one or more image segments as part of a local data insertion operation are avoided.

26 Claims, 5 Drawing Sheets

METHODS FOR REDUCED COST INSERTION OF VIDEO SUBWINDOWS INTO COMPRESSED VIDEO

RELATED APPLICATIONS

This application claims the benefit of U.S. Provisional Application No. 60/064,584 filed Oct. 20, 1997.

FIELD OF THE INVENTION

The present invention relates to image processing and, more particularly, to methods and apparatus of encoding digital images to facilitate the subsequent insertion of additional image data into previously encoded images and to methods and apparatus for inserting said additional image data.

BACKGROUND IF THE INVENTION

There are known networked distribution systems for transmitting television programming whereby audio visual material is transmitted to a number of affiliated stations, each of which retransmits the programming to viewers' homes. FIG. 1 illustrates a known system 10 for distributing analog video data, e.g., NTSC television signals. Within the known system, it is common practice for the local affiliate station(s) 12, 14, 16 to electronically overlay a station logo (or other identification) or other local informational content over the network video signal, e.g., a corner portion of the broadcast images. In this manner, the video pictures that are presented to viewers, e.g., homes A–Z, include picture content that has been locally inserted. In the case of analog television (e.g. NTSC) achieving the overlay of local content on the network signal can be easily accomplished by electronically adding or switching video signals.

It appears that there is a significant desire to perform the local insertion of picture content within emerging digital television networks. In these digital networks, highly compressed digital video will be delivered to viewers' homes. MPEG video coding will be used to accomplish this high degree of compression in many proposed digital television systems.

In order to obtain high compression efficiency, video compression techniques (e.g. MPEG) employ motion compensated prediction, whereby a region of pixels in the picture being compressed is coded by coding the difference between the desired region and a region of pixels in a previously transmitted reference frame. The term "motion compensated" refers to the fact that the position of the region of pixels within the reference frame can be spatially translated from the position of the region being coded, in order to compensate for motion, e.g., of the camera or in the scene, that occurred between the time that the two pictures were captured.

FIG. 2 illustrates the use of motion compensated prediction, in the form of motion vectors, to code a second image, Image 2 as a function of pixel values included in a reference frame, Image 1. In FIG. 2, Image 1 and Image 2 both comprise a plurality of segments including Segments A, B, and C. Using the known motion compensated prediction techniques, a segment of Image 2 may be coded using a motion vector which refers to, e.g., a block of pixel values corresponding to a segment of Image 1 that is located outside the image segment that is being coded. By transmitting motion vectors as opposed to the actual pixel values, efficient motion compensated prediction coding of Image 2 is achieved.

Note that in the FIG. 2 prior art example Segment A of Image 2 is represented using motion vectors 23, 25 which reference Segments B and C of Image 1. Motion vector 23 is an Image 2 motion vector which defines a portion of Image 2, Segment A as a function of a portion of (Image 1, Segment C). Motion Vector 25 is an Image 2 motion vector which defines a portion of (Image 2, Segment A) as a function of a portion of (Image 1, Segment B).

As discussed above, it is sometimes desirable to insert local image data into a previously encoded image. For example, a local broadcaster may want to insert a logo into Segment B of the image which is to be broadcast.

The use of motion compensated prediction makes it difficult for a local broadcaster to insert data into an encoded image by merely replacing encoded data blocks without running the risk of introducing errors into other frames which may rely on the image being modified as a reference frame. The difficulty of inserting new encoded image data in the place of previous encoded image data arises from the fact that the original coded blocks of subsequent coded images that are not part of the subset being replaced "assume" that the content of the replaced blocks is the original coded picture content. In such cases, any attempt to change the content of a subset of the blocks in the coded bitstream is likely to cause annoying prediction errors to propagate through the rest of the video, where blocks outside of the replaced subset were coded based on motion compensated predictions using picture content within the subset.

For example, if a logo was inserted into Segment B of Image 1 by substituting encoded data representing the logo for the encoded image data representing the original image content of Segment B of Image 1, a prediction error would result in Segment A of Image 2. Such a prediction error occurs because a portion of the logo as opposed to the original image content of Segment B of Image 1 will now be incorporated into Segment A of Image 2 by virtue of the use of the motion vector 25.

In the absence of techniques for selectively replacing coded blocks of pixels in video bitstreams compressed with motion compensated prediction, there are two alternative approaches:

1) Distribution of compressed video to affiliates (local stations) by forgoing the use of motion compensated prediction. This would decrease compression efficiency so greatly that this approach would be unacceptable for final transmission to viewers.

2) Encoding or decoding and then re-encoding of a series of complete video images at the point of local transmission. This approach removes motion vectors generated by the original encoding and then generates an entirely new set of motion vectors based on the images into which data has been inserted. This approach has the disadvantage of requiring the use of expensive video encoders at the local affiliate station capable of encoding a series of complete images. Also, this approach would generally require concatenated compression whereby video is first compressed for distribution to the affiliates, then fully decompressed and recompressed for final transmission, after local picture content is inserted into the unencoded images generated by fully decoding the originally encoded images. The application of concatenated compression generally results in picture degradation and when applied to complete images will, in many cases, result in final (home) picture quality which is unacceptable.

Accordingly, there is presently a need for cost effective methods and apparatus which will support: 1) the transmission of encoded digital video data, 2) the ability of local stations to insert sub-images and other local content into previously encoded video images; and 3) still provide an acceptable level of image quality to the final viewer of the encoded images, e.g., the home viewer of a video broadcast.

SUMMARY OF THE PRESENT INVENTION

The present invention comprises methods which permit bandwidth efficient video compression for distribution to affiliates, and which allow the insertion of local picture content without the need for complete decompression and recompression. This is accomplished by the addition of a motion vector control module in the original video encoder which controls the selection of motion vectors during the initial data compression (encoding) process. In accordance with the present invention, an encoder operator can define one or more non-overlapping subregions of the picture where local insertion is to be enabled. Alternatively, preselected and predefined image subregions may be used at encoding time. The motion vector control module determines the minimum subset(s) of macroblocks in the picture that encompass the defined subregion(s). During encoding, the motion vector control module acts to guarantee that motion vectors associated with macroblocks outside of these subsets never result in the use of any pixels contained within the subsets for constructing predictions. Optionally, this module ensures that motion vectors associated with macroblocks within a subset never result in the use of pixels outside of the subset for constructing predictions. Additionally, the encoder contains a module which is capable of transmitting information to affiliate stations regarding the size, number and location of image subwindows or subregions into which data may be inserted. The information transmitted to a local station may include, e.g., the number of subsets of macroblocks available for local insertion, information identifying macroblocks belonging to each subset, and information informing the local station as to whether or not the optional motion vector constraint described above was enforced.

The present invention also involves an inserter device, which would reside at the local affiliate station that receives the information regarding the number and placement of subsets of macroblocks that have been made available for local insertion. An operator at the affiliate station can specify the location and picture content for local insertion. The inserter circuit parses through the coded digital bitstream representing the received encoded images, removes the data corresponding to the macroblocks that are affected by the desired local insertion, and replaces them with data corresponding to the desired local picture content. If it is desired that the local picture content includes pixels from the original video, then some amount of decoding of the original video would be performed. In cases where the optional motion vector constraint, described above, is enforced, then only those bits corresponding to the macroblocks need to be decoded. When the optional motion vector constraint were not enforced, then the inserter would decode some or all of the surrounding macroblocks in order to guarantee proper decoding of the pixels within the macroblocks that are to be affected by local insertion.

Another approach involves the use of SNR scaleable coding. In this embodiment, the local picture content is added by the addition of an enhancement bitstream, such as the SNR scaleable enhancement defined by MPEG-2. In addition to the local picture content, the SNR insertion device might optionally act to corrupt a small number of coded macroblocks of the network encoded bitstream, and encode the negative of the corruption signal in the SNR enhancement layer. In this way a program provider might be able to encourage the purchase of receivers that are capable of the SNR scaleable decoding, and discourage the inactivation of this feature to avoid viewing the local picture content.

DETAILED DESCRIPTION

As discussed above, the present invention relates to methods and apparatus of encoding digital images to facilitate the subsequent insertion of additional image data into previously encoded images. It also relates to methods and apparatus for inserting additional image data into data representing previously encoded images.

Figure 4:
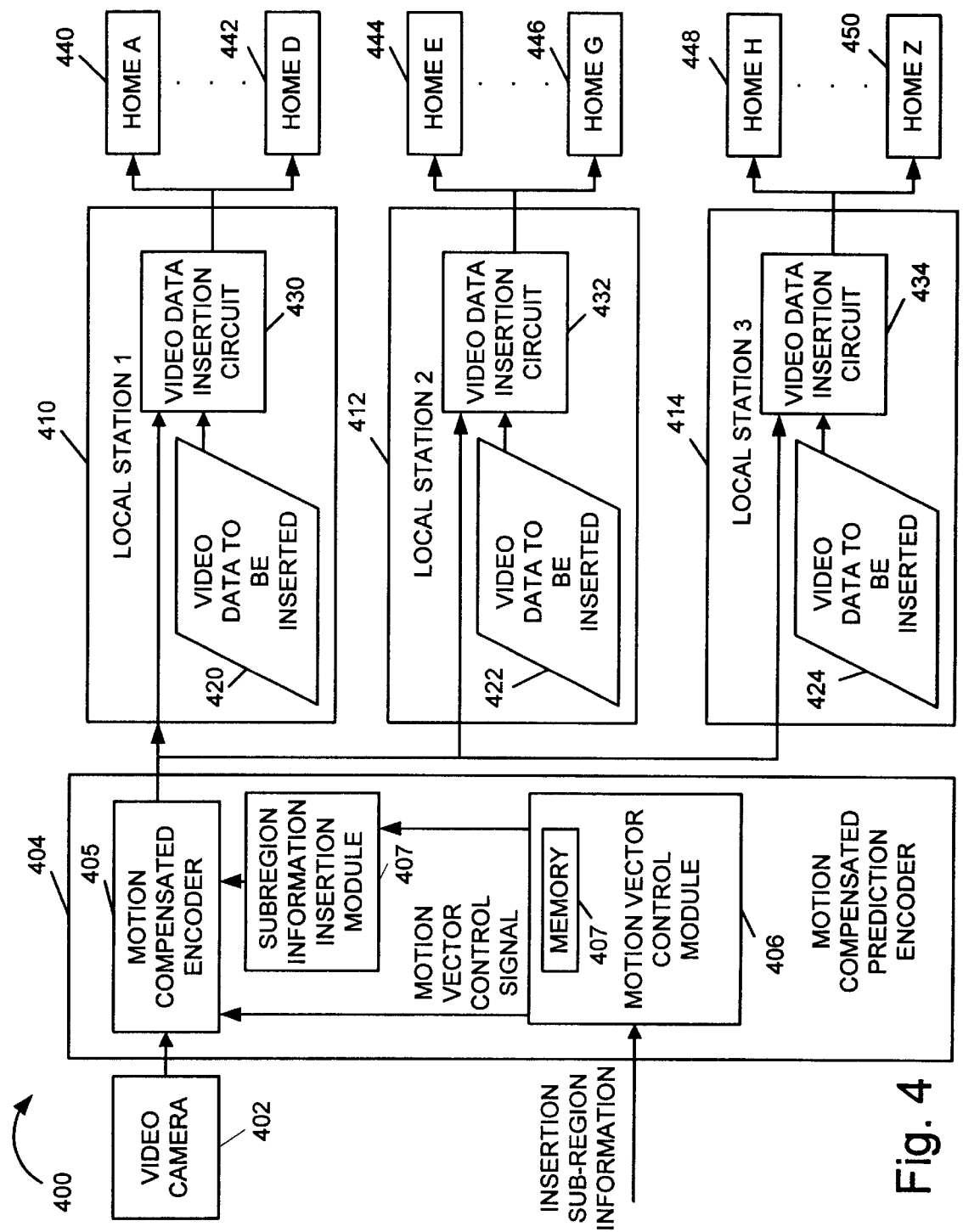
FIG. 4 illustrates a digital video generation and transmission system implemented in accordance with one embodiment of the present invention.

FIG. 4 illustrates a digital video generation and transmission system 400 implemented in accordance with one embodiment of the present invention. The system 400 comprises a source of unencoded video data, e.g., a video camera, an encoder 404 for encoding video data in accordance with the present invention, a plurality of local transmission stations 410, 412, 414 and a plurality of homes 440, 442, 444, 446, 448, 450. The homes include video decoders and display devices for viewing the encoded video signals transmitted thereto from the local stations 410, 412, 414.

In the FIG. 4 embodiment, the video camera 402 generates unencoded video data in the form of an unencoded digital video data stream. Alternatively, the video cameral 402 may output an analog video data stream. The unencoded video data stream generated by the video camera 402 is supplied to a motion compensated encoder 405 included within the motion compensated prediction encoder 404. In the event that an analog video signal is supplied to the encoder 404, it is converted into a digital data stream using, e.g., an analog to digital (A/D) converter, prior to performing an encoding operation thereon.

In accordance with the present invention, images which are to be encoded are segmented into different regions or sub-regions, representing different image segments, for encoding purposes. Information regarding the image regions into which data may be inserted by local stations is stored in a memory 407 which is included within the motion vector control module 406. The stored insertion region information will normally identify one or more non-overlapping image subregions where local insertion is to be enabled. These subregions may be identified and input to the motion vector control module 406 by an operator of the encoder 404 or pre-programmed into the memory 407. At encoding time, the use of pre-programmed sub-region information results in images being treated as having predefined image subregions which are to be treated separately for motion compensated prediction purposes.

The motion compensated encoder 405 is responsible for encoding the video data received from the video camera 402 using motion compensated prediction encoding techniques which involve the generation of motion vectors. The encoder 404 may be an MPEG-2 encoder which generates, as a function of a motion vector control signal, an MPEG-2 compliant bitstream from the video data input thereto. As will be discussed below, the motion vector control signal controls which regions of a previous or subsequent image may be used as reference data when encoding various distinct regions, e.g., segments, of a current image.

The motion vector control module 406, includes computer software, logic circuitry or a combination of the two. The computer software may be stored in the memory 407 along with the sub-region information. The motion vector control module 406 controls the selection and/or generation of motion vectors during compression, e.g., during encoding by the motion compensated encoder 405. The motion vector control module determines the minimum subset(s) of macroblocks in the picture that encompass the image subregion (s) defined by the supplied or pre-selected sub-region information stored in the memory 407. For future reference, the subsets of macroblocks which define image subregions, e.g., image segments, where data may subsequently be inserted will be termed "local insertion subsets", and the set of macroblocks that are not contained in any local insertion subsets will be termed the "main picture subset".

The motion vector control module 406 checks to insure that operator entered subregions do not overlap thereby ensuring that none of the resulting local insertion subsets are overlapping collections of macroblocks.

During encoding, the motion vector control module 407 controls the motion compensated encoder 404 to guarantee that motion vectors associated with macroblocks in the main picture subset do not use pixels included within the local insertion subsets for constructing predictions. In one particular embodiment, the motion vector control module 406 also ensures that motion vectors associated with macroblocks within one or more of the local insertion subsets do not use pixels of preceding or adjacent images, outside of the particular subset for constructing predictions. This requirement that predictions generated to represent image segments selected for data insertion be generated from a corresponding image segment of a preceding or subsequent image will be referred to herein as an optional motion vector constraint since it is optional to the extent that it is an additional constraint not included in the previously discussed embodiment.

The encoder of the present invention also includes a subregion information insertion module 407 which is responsible for supplying information specifying the number of local insertion subsets, identifying the macroblocks belonging to each local insertion subset, and, for each local insertion subset, indicating whether or not the optional motion vector constraint described above was enforced. In one embodiment, the encoder 405 encodes the information supplied by the subregion information insertion module as auxiliary data which is combined with the encoded video data prior to transmission to the local stations 410, 412, 414. Thus, via the motion compensated encoder 405, the subregion information insertion module 407 is capable of transmitting information to affiliate stations 410, 412, 414 regarding the number of local insertion subsets, identifying the macroblocks belonging to each local insertion subset, and, indicating for each local insertion subset, whether or not the optional motion vector constraint described above was enforced.

The motion vector control module 406 can be embodied in a variety of ways. In one embodiment, it acts to limit the set of candidate motion vector values searched by the motion compensated encoder 405 during the motion estimation process. In such an embodiment, the motion vector control module 406 constrains the motion estimation process performed by the encoder 405 to avoid consideration of motion vector values that would result in the use of disallowed pixels as prediction references.

In another embodiment, the motion vector control module 404 acts by determining whether the motion vector selected by the motion estimation process of the encoder 405 would result in the use of disallowed pixels as prediction references and, when this is the case, substituting a motion vector value of zero to be used during actual encoding.

The motion compensated encoder of the present invention 404 generates a compressed video bitstream, e.g., an encoded MPEG-2 compliant bitstream, which is supplied to a plurality of local stations 410, 412, 414 for distribution to end viewers. The local stations may be remotely located from the encoder 404 and coupled thereto, e.g., by satellite, cable or other high rate digital communication medium.

Figure 1:
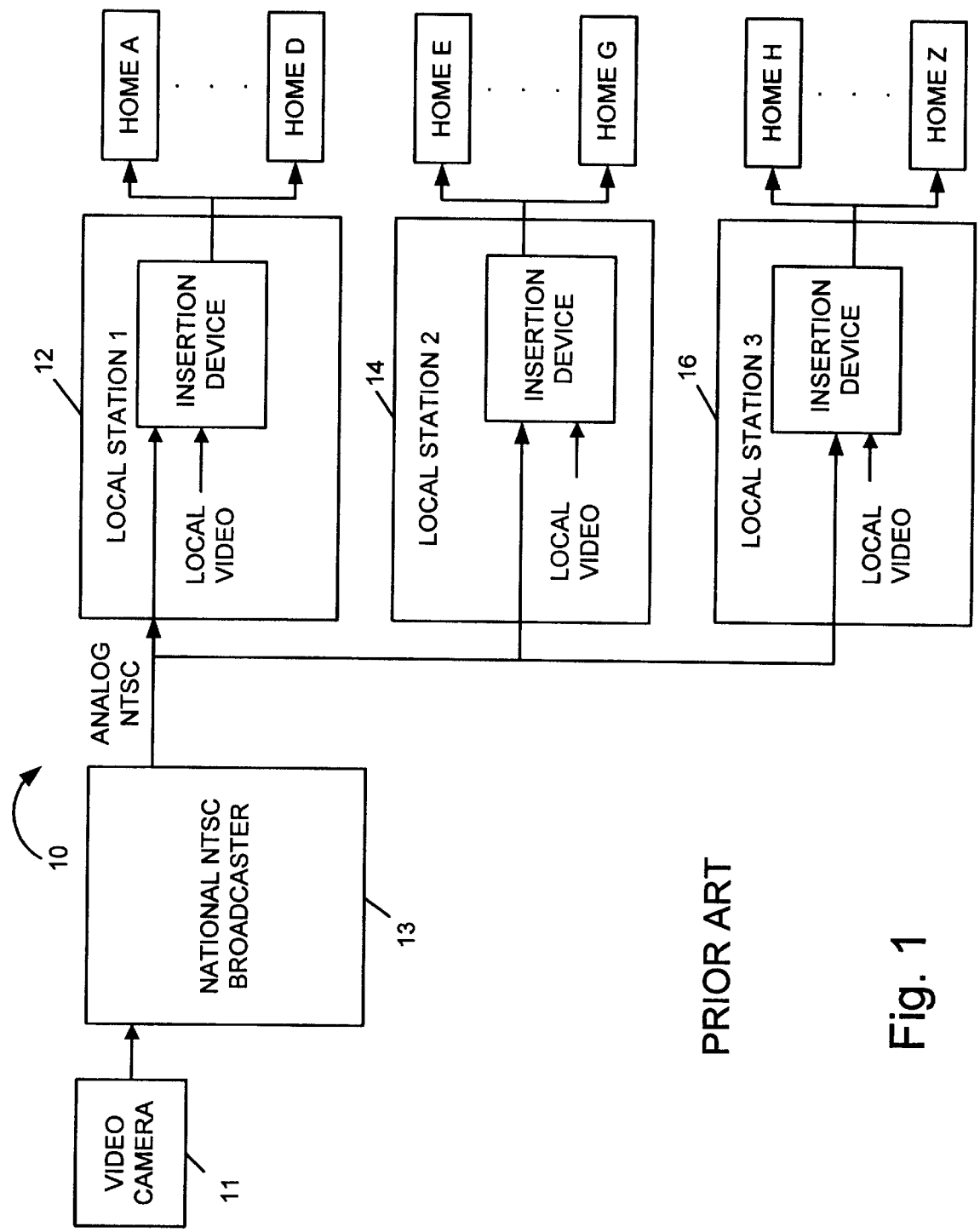
FIG. 1 illustrates a prior art system for generating and broadcasting analog NTSC television signals.
Figure 2:
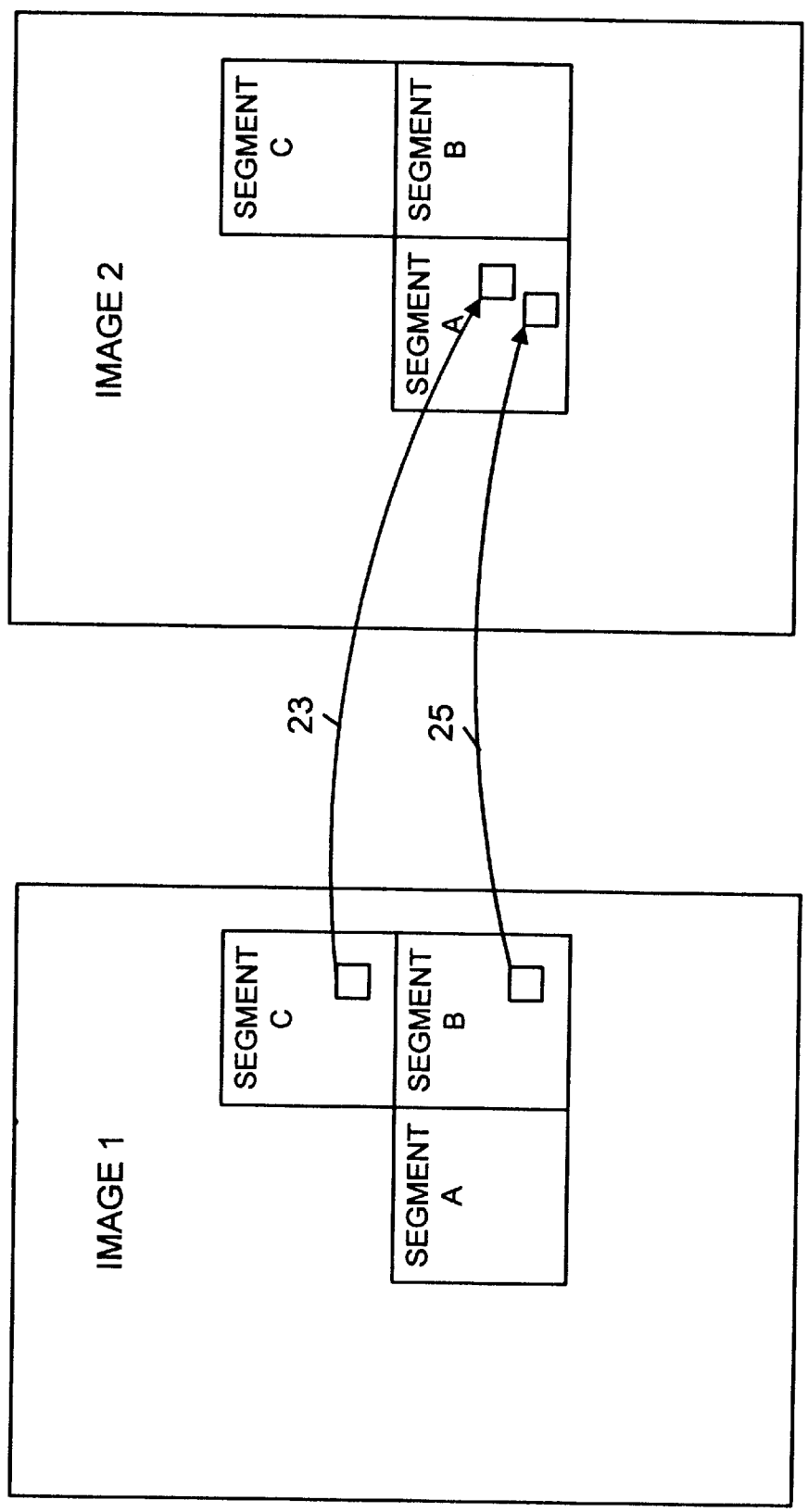
FIG. 2 illustrates a prior art encoding technique involving the use of motion compensated prediction.
Figure 3:
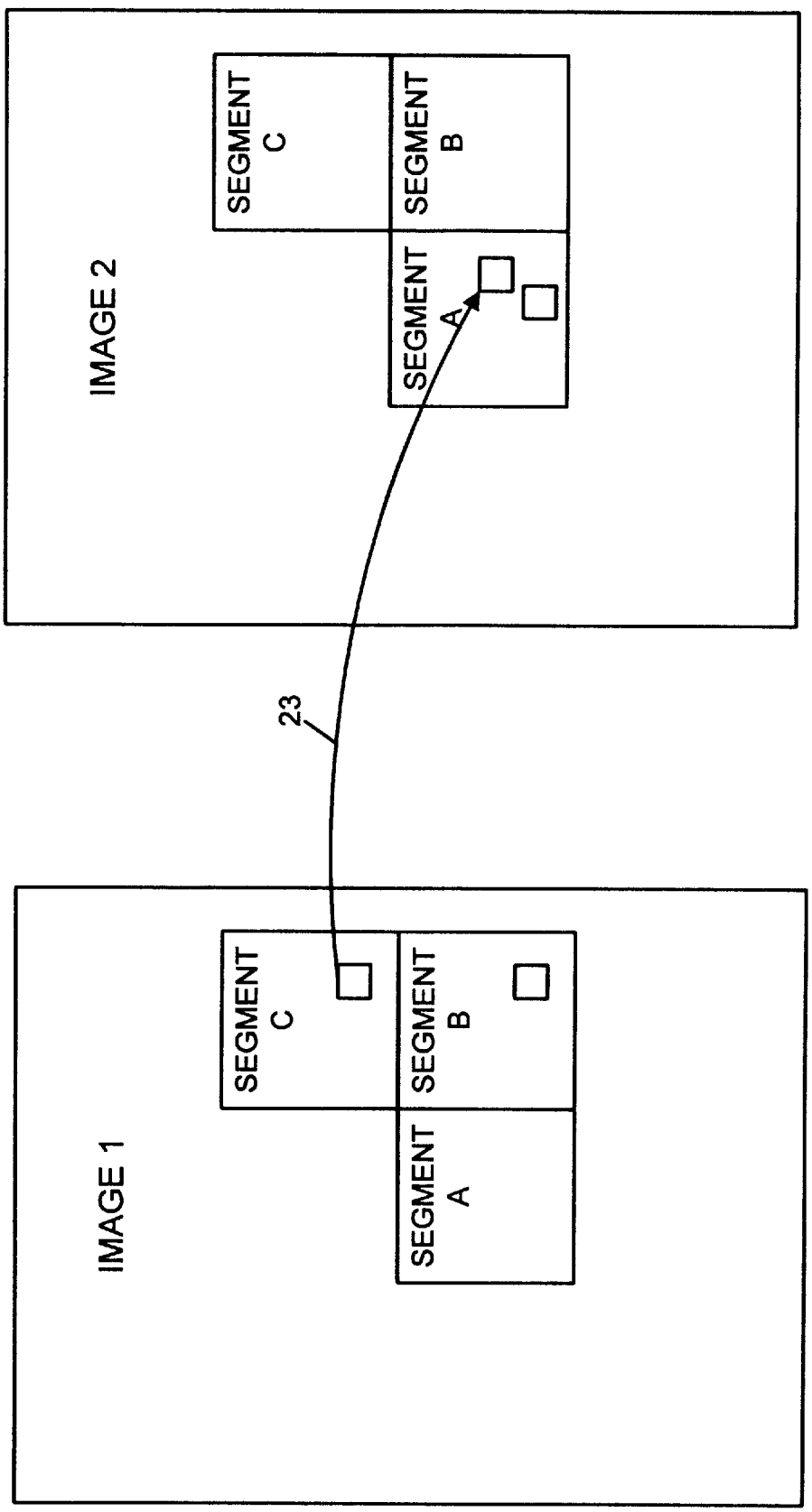
FIG. 3 illustrates an encoding technique implemented in accordance with the present invention.

FIG. 3 illustrates the result of the encoding constraints of the present invention on images 1 and 2 previously illustrated as being encoded in the manner illustrated in FIG. 2. Note that in the FIG. 3 example of the present invention, segment B has been selected as a segment to be used for local data insertion. In accordance with the present invention encoding of non-segment B image segments using motion vectors which reference segment B is prohibited. Accordingly, in the FIG. 3 example, segment A is encoded using a motion vector 23 which references segment C but use of the motion vector 25 which references segment B is prohibited resulting in segment A being encoded without the use of motion vector 25.

As discussed above, each local station may choose to insert video data, e.g., advertisements or emergency warnings, into the received video data prior to distribution to the end viewers. The video data 420, 422, 424 to be inserted at the local stations 410, 412, 414, respectively, is normally stored at the local station, e.g., on magnetic tape. In addition, or alternatively, the local stations 410, 412, 414 may insert data that is generated live, such as for emergency messages.

In order to insert video data into the encoded bitstream generated in accordance with the present invention, each local station 410, 412, 414, includes a video data insertion circuit, 430, 432, 434, respectively.

Figure 5:
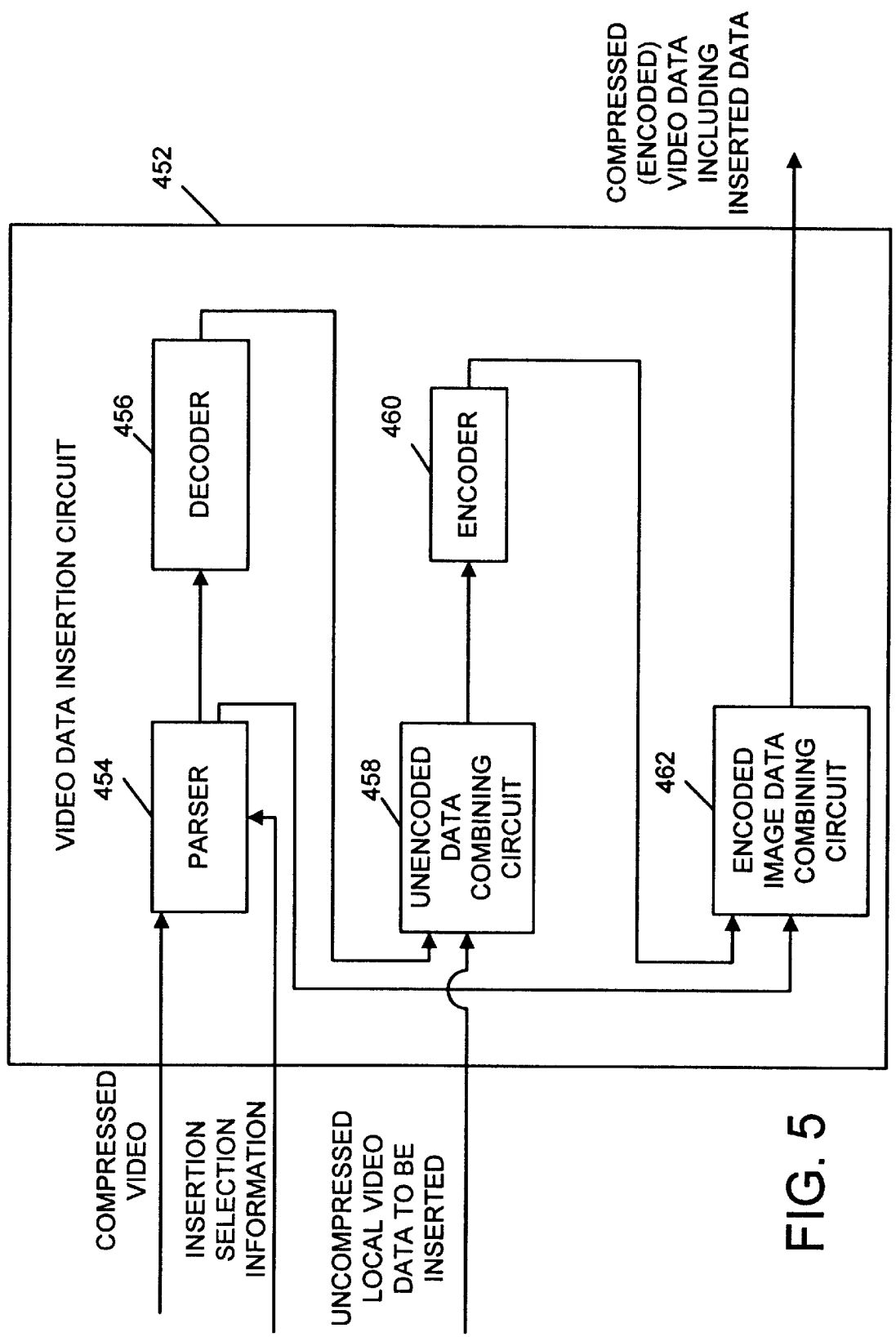
FIG. 5 illustrates a video data insertion circuit suitable for use in the system illustrated in FIG. 4.

FIG. 5 illustrates a video data insertion circuit 452 suitable for use as any one of the video data insertion circuits 430, 432, 434. The video data insertion circuit 452 comprises a parser 454, a decoder 456, an unencoded data combining circuit 458, an encoder 460 and an encoded image data combining circuit 462 coupled together as illustrated in FIG. 5.

The video data insertion circuit 452 receives as its input compressed video, e.g., an encoded MPEG-2 bitstream, obtained form the encoder 404 and uncompressed local video data to be inserted.

Since the information regarding the number and placement of local insertion subsets and/or image segments to be used for data insertion is included in the received encoded data, the video data insertion circuit 452 has this information available to it. Such information may be read from the received data by the parser 454. In one embodiment where local insertion subsets are preselected at the encoder, the preselected insertion subsets are also programmed into the video data insertion circuits 430, e.g., the parser 454. In such a case, the insertion circuit 452 will be aware of the supported local insertion subsets without the need for obtaining the information from the received encoded bitstream.

An operator of the insertion circuit 430, 432, or 434 can select one or more of the local insertion subsets, e.g., by supplying an insertion selection information signal which identifies one or more insertion subsets to be identified and used by the parser 454. The insertion selection information signal may, alternatively, identify the image location or locations into which the video data is to be inserted. The insertion selection information signal may automatically be generated by a computer, e.g., using default selection values corresponding to an image area which is large enough to contain the image data to be inserted.

At the local station, the picture content, e.g., one or more logos, to be applied or inserted to each selected local insertion subset, is specified, e.g., by supplying the uncompressed local video data to be inserted to the video data insertion circuit 452.

In one embodiment the insertion device 452 uses the parser 454 to parse through the received coded bitstream. The parser 454 identifies and removes the data corresponding to the macroblocks in the selected local insertion subsets. The received encoded data corresponding to the selected insertion subsets to be replaced or modified is supplied, along with additional data from the received bitstream required for accurate decoding, to the decoder 456.

In cases where the optional motion vector constraint, described above, was enforced for a given local insertion subset which is being used for data insertion resulting in the corresponding image segment being encoded using motion vectors referencing the same image segment of one or more different images, then only those bits corresponding to the macroblocks in the local insertion subset output by the parser 454 are decoded. If the optional motion vector constraint is not enforced, then the decoder 456 decodes some or all of the surrounding macroblocks in order to ensure proper decoding of the pixels within the macroblocks that are to be affected by local insertion.

The decoder 456 operates to decode the received data corresponding to the image portion to be replaced or modified with the local data to be inserted. The decoded image data generated by the decoder 456 is used when the desired effect of the locally inserted picture content is a translucent overlay, or selectively transparent overlay or otherwise involves the use of the received video.

Thus, decoded video data corresponding to the image area into which data is to be inserted is output by the decoder 456. This decoded video data is supplied to a first input of the unencoded data combining circuit 458. A second input of the unencoded data combining circuit 458 receives, via an uncompressed local video data input, the uncompressed local image data to be inserted.

In cases where the data to be inserted corresponds to only a portion of the insertion segment or is intended to be, e.g., a transparent overlay, requiring some combination with the original image data, the unencoded data combining circuit 458 is used to combine the unencoded video data to be inserted and the unencoded video data output by the decoder 456. When the locally supplied video data is intended to be inserted without being combined with the original video data, the unencoded data combining circuit 458 is bypassed or disabled.

The unencoded video data output by the combining circuit 458 is coupled to the input of the encoder 460. In the case where the local image data is not combined with the decoded data output by the decoder 456, the input to the encoder 460 will comprise the local data to be inserted. In cases of, e.g., overlays, the data input to the encoder 460 will be the result of a combination of received decoded data and the local data to be inserted.

The encoder 460 generates encoded image data which is compliant with the encoding scheme used by the original encoder 404. Once generated the encoded data output by the encoder 460 is supplied to a first input of the encoded image data combining circuit 462.

In addition to receiving encoded image data to be inserted, the encoded image data combining circuit receives, from the parser 454, the received encoded image data less the data corresponding to the portion of the received image which was removed by the parser 454 to be replaced by the data to be inserted.

The encoded image data combining circuit 462 combines the encoded data received from the parser 454 and the encoder 460 to generate an image or images which include the local video data which was to be inserted. The output of the combining circuit 462 serves as the output of the video data insertion circuit 452. It is this encoded video data, including the locally inserted image data, that is supplied to the homes coupled to the local station 410, 412, or 414 which inserted the data.

In some embodiments, the insertion circuit 452 may have to parse through the entire bitstream in order to extract and replace the bits corresponding to the selected local insertion subsets. The process of identifying, extracting and replacing data in the received encoded bitstream can, and in various embodiments is, simplified in various ways.

For example, in one particular embodiment, the initial encoder 404 includes a module incorporated into the encoder 405, that causes the coded macroblocks in the local insertion subsets to be immediately preceded by a synchronization code (e.g. a slice_start_code in the case of MPEG coding). Accordingly, in one embodiment a synchronization code is inserted by the encoder 405 immediately before bits representing an image segment intended to support data insertion. This simplifies the subsequent parsing operation performed by the insertion circuit 452 and allows for low complexity parsing of the data to identify the location of the bits, e.g., by looking for the inserted header, corresponding to macroblocks of local insertion subsets.

In another exemplary embodiment the initial encoder 404 includes a module which provides information to affiliate stations as to the byte and bit locations of the coded macroblocks of the local insertion subsets. This allows the extraction and replacement for local insertion to take place without the need for parsing bits of the main picture subset.

In yet another exemplary embodiment SNR scaleable coding is used. In such an embodiment, the local picture content is added by the addition of an enhancement bitstream, such as the SNR scaleable enhancement defined by MPEG-2. In addition to the local picture content, the SNR insertion device can optionally act to corrupt a small number of coded macroblocks of the network encoded bitstream, and encode the negative of the corruption signal in the SNR enhancement layer.

In this way a program provider could encourage the purchase of receivers that are capable of the SNR scaleable decoding, and discourage the inactivation of this feature to avoid viewing the local picture content. This approach is applicable for systems where the ability to decode SNR scaleable bitstreams exist, e.g., in at least some of the homes where the encoded data is ultimately decoded and displayed.

The present invention can be used to provide cost effective, bandwidth efficient, network distribution of compressed video with the ability to perform local insertion of picture content without complete recompression.

What is claimed is:

1. A method of processing video data comprising the steps of:

encoding video data representing a series of images using motion compensated prediction on at least some of the images being encoded, the step of encoding the video data of at least one image in said series including the step of generating motion vectors for a first contiguous image area and a second contiguous image area of said at least one image, each of said first and second contiguous image areas being smaller than a full area of said at least one image, the step of generating motion vectors for the first contiguous image area including:

limiting the generation of motion vectors for the first contiguous image area so that coded pixels in the first contiguous image area are limited to be a function of coded pixels of a corresponding first contiguous image area of a preceding or a subsequent image, said corresponding first contiguous image area being located in said preceding or subsequent image at the same location said first contiguous image area is located in said at least one image.

2. The method of claim 1, wherein the step of encoding the video data further includes generating motion vectors for the second image area, the step of generating motion vectors for the second contiguous image area including:

limiting the generation of motion vectors for the second contiguous image area so that coded pixels in the second contiguous image area are limited to be a function of coded pixels of a corresponding second contiguous image area of said preceding or subsequent image; and wherein the second contiguous image area is an image subwindow located within said full image area.

3. The method of claim 1, further comprising the steps of:

transmitting encoded data representing the encoded images to a transmitting station, removing from encoded data received by the transmitting station encoded data corresponding to the second image area to generate a set of encoded main picture data; and combining the encoded main picture data with additional encoded data including at least some data content provided at the transmitting station.

4. The method of claim 2, further comprising the steps of:

transmitting encoded data representing the encoded images to a transmitting station, removing from encoded data received by the transmitting station encoded data corresponding to the second image area to generate a set of encoded main picture data; and combining the encoded main picture data with additional encoded data including at least some data content provided at the transmitting station.

5. The method of claim 4, further comprising the steps of:

decoding at least some of the removed encoded data;

combining the decoded data with at least some additional data; and encoding the combined decoded data and additional data to generate said encoded data including at least some data content provided at the transmitting station.

6. The method of claim 5, further comprising the steps of:

transmitting the combined encoded main picture data and additional encoded data to a video decoder;

decoding the combined encoded main picture data and additional encoded data; and displaying the decoded data.

7. A method of processing video data comprising the steps of:

encoding video data representing a series of images using motion compensated prediction on at least some of the images being encoded, each image being encoded including first and second image areas, said first and second image areas being in the same location in each image in the series of images, the step of encoding the video data including the step of generating motion vectors for the first and the second image areas of at least one image, said first and second image areas being rectangular contiguous image areas, the step of generating motion vectors for the first image area including limiting the generation of motion vectors for the first image area so that coded pixels in the first image area are limited to be a function of coded pixels of a corresponding first image of a preceding or subsequent image;

transmitting data representing the encoded images to a transmitting station, decoding the encoded video data corresponding to the second image portion of at least one encoded video image;

processing the decoded image data to combine it with additional image data;

encoding the image data resulting from the combination of the decoded image data and the additional image data to generate encoded insert image data;

transmitting encoded image data corresponding to the first segment of the images received by the transmitting station and the encoded insert image data to the video decoder, and decoding and displaying the encoded image data transmitted to a video decoder.

8. The method of claim 2, wherein the step of encoding video data representing a series of images using motion compensated prediction techniques further comprises the step of:

generating information identifying the portions of the images upon which motion compensated prediction was separately applied.

9. The method of claim 8, wherein the second segment is an image subwindow into which data can be inserted by a local broadcaster, the method further comprising the step of:

transmitting to the local broadcaster the generated information identifying the image subwindow into which data can be inserted.

10. A method of encoding a second image an a function of a first image, the first and second images each including a first and a second non-overlapping image segment, each of the first and second non-overlapping image segments including a plurality of vertically contiguous pixels, the first non-overlapping image segment occurring in the same location in each of the first and second images, the method comprising the steps of:

using as reference data from the fist image, only image data corresponding to the first image segment of the first image, when generating motion vectors to represent a portion of the first image first segment of the second image; and using as reference data from the first image, image data corresponding to the second image segment of the first image, when generating motion vectors to represent a portion of the second image segment of the second image.

11. The method of claim 10, wherein the method further involves encoding the second image as a function of a third image in addition to the first image, the method further comprising the steps of:

using as reference data from the third image, only image data corresponding to a first image segment of the third image, when generating motion vectors to represent a portion of the first image segment of the second image.

12. The method of claim 11, further comprising the step of:

using as reference data from the third image, image data corresponding to the second image segment of the first image, when generating motion vectors to represent a portion of the second image segment of the second image.

13. The method of claim 12, wherein the first image precedes the second image in a video sequence and the third image follows the second image in a video sequence, the method further comprising the step of:

limiting the use of image data, for reference purposes when generating motion vectors to represent the second image segment of the second image, included in the first and third images solely to use of the second image segment when encoding the second image segment of the second image.

14. The method of claim 10, wherein each of the first and second images further includes a third image region, the third image region being distinct from the first and second image regions and corresponding to the same portion of each of the first and second images, the method further comprising the step of:

using as reference data from the first image, only image data corresponding to the third image segment of the first image, when generating motion vectors to represent a portion of the third image segment of the second image.

15. The method of claim 10, further comprising the step of:

inserting into the encoded data representing the second image, at least one bit identifying the position of the encoded data representing the second image segment within the encoded data representing the second image.

16. The method of claim 10, wherein the first and second image regions are encoded using independent non-overlapping sets of reference data for motion compensated prediction purposes, the method comprising the steps of:

inserting into the encoded data, information identifying each of the image segments which is independently encoded using motion compensated prediction techniques.

17. A video encoder, comprising;

a motion compensated prediction encoding circuit for generating motion vectors to represent segments of a second image as a function of a first image; and a motion vector control module for controlling the motion compensated prediction module to encode an image as a plurality of distinct non-overlapping image segments at least one contiguous segment of which is encoded using only a positionally corresponding contiguous image segment of the first image as reference data when generating motion vectors to represent the segment of the second image.

18. The video encoder of claim 17, further comprising:

means for including information identifying encoded data corresponding to at least one of the distinct non-overlapping image segments in the encoded data.

19. A video encoder, comprising:

memory for storing information used to identify a plurality of distinct non-overlapping image segments which comprise an image, at least some of said distinct non-overlapping image segments being contiguous image segments; and an encoder which performs motion compensated encoding on a least one contiguous segment of an image being encoded using reference image data obtained only from the positionally corresponding contiguous image segment of one or more additional images.

20. The video encoder of claim 19, further comprising:

a circuit for including information within a set of generated encoded data identifying encoded data corresponding to said at least one segment.

21. A system for inserting data into an encoded bitstream, comprising:

a parser for extracting data corresponding to an image segment to be replaced and for generating a set of encoded main image data which does not include the extracted encoded image segment data; and an encoded image data combining circuit for combining the encoded main image data with insert encoded image segment data to generate a modified set of encoded image data.

22. The system of claim 21, further comprising:

a decoder coupled to the parser for receiving and decoding the extracted image data;

an unencoded data combining circuit coupled to the decoder for receiving decoded image data obtained from the decoder with unencoded local image data to generate a set of unencoded image data representing the image segment to be replaced; and an encoder, coupled to the unencoded data combining circuit for encoding the set of unencoded image data representing the image segment to be replaced to thereby generate the set of insert encoded image segment data.

23. The method of claim 1, wherein said at least one image is a frame.

24. The method of claim 7, wherein each of said series of images is a frame.

25. The method of claim 10, wherein said first and second images are frames.

26. The video encoder of claim 17, wherein said first and second images are frames.

* * * * *